United States Patent
Lehnertz

(10) Patent No.: US 9,978,269 B2
(45) Date of Patent: May 22, 2018

(54) SITE-SPECIFIC TRAFFIC ANALYSIS INCLUDING IDENTIFICATION OF A TRAFFIC PATH

(71) Applicant: Robert Bosch GmbH, Stuttgart (DE)

(72) Inventor: Benedikt Lehnertz, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 14/703,548

(22) Filed: May 4, 2015

(65) Prior Publication Data

US 2015/0325119 A1 Nov. 12, 2015

(30) Foreign Application Priority Data

May 7, 2014 (DE) .................. 10 2014 208 524

(51) Int. Cl.
G08G 1/01 (2006.01)
G01S 13/06 (2006.01)
G08G 1/052 (2006.01)
B61L 23/04 (2006.01)
B61L 29/30 (2006.01)

(52) U.S. Cl.
CPC .......... *G08G 1/0133* (2013.01); *B61L 23/041* (2013.01); *B61L 29/30* (2013.01); *G01S 13/06* (2013.01); *G08G 1/0116* (2013.01); *G08G 1/0145* (2013.01); *G08G 1/052* (2013.01)

(58) Field of Classification Search
CPC ...... G08G 1/166; G08G 1/167; G08G 1/0104; G08G 1/0133; G01S 13/931; G01S 2013/936; G01S 13/66; G01S 13/726; G01S 13/867; B60W 2420/42; B60W 2520/10; B60W 2550/10; B60W 2550/302; B60W 2550/304; B60W 2550/306; B60W 2550/308; B60W 2720/10; B62D 15/025; B62D 15/0265; B62D 15/029; H04W 4/02
USPC .......... 701/41, 83, 93, 118, 300; 455/456.3; 280/735; 379/32.01; 709/224; 715/765; 382/103; 705/7.29; 434/247; 348/156
See application file for complete search history.

(56) References Cited

U.S. PATENT DOCUMENTS

2004/0152474 A1* 8/2004 Chen .................. H04W 4/02 455/456.3
2006/0252017 A1* 11/2006 Vorozhtsov ........ A63B 24/0006 434/247
2007/0228705 A1* 10/2007 Rao ..................... B60R 21/0134 280/735

(Continued)

FOREIGN PATENT DOCUMENTS

| DE | 196 12 579 | 10/1997 |
|---|---|---|
| DE | 10 2006 040 542 | 3/2008 |
| DE | 10 2007 032 091 | 4/2009 |

*Primary Examiner* — Anne M Antonucci
*Assistant Examiner* — Sanjeev Malhotra
(74) *Attorney, Agent, or Firm* — Norton Rose Fulbright US LLP; Gerard Messina

(57) ABSTRACT

A device for site-specific traffic analysis includes: a radar sensor at a traffic space; and an evaluation unit configured to (i) ascertain object trajectories from chronological sequences of object positions of respective objects detected by the radar sensor and moving in the traffic space, (ii) identify the location of at least one traffic path based on a concentration of object trajectories, and (iii) assign further detected objects to a respective traffic path whose location has been identified.

12 Claims, 4 Drawing Sheets

(56) References Cited

U.S. PATENT DOCUMENTS

| | | | |
|---|---|---|---|
| 2007/0291118 A1* | 12/2007 | Shu | H04N 7/18 348/156 |
| 2008/0019566 A1* | 1/2008 | Niem | G06K 9/00771 382/103 |
| 2010/0040206 A1* | 2/2010 | DelRegno | H04L 47/10 379/32.01 |
| 2011/0161136 A1* | 6/2011 | Faith | G06Q 30/0201 705/7.29 |
| 2011/0208399 A1* | 8/2011 | Fekete | G08G 1/0104 701/93 |
| 2011/0243376 A1* | 10/2011 | Luke | G06K 9/3241 382/103 |
| 2012/0101711 A1* | 4/2012 | Furmston | G01S 7/415 701/300 |
| 2012/0278479 A1* | 11/2012 | Miller | H04L 12/4633 709/224 |
| 2013/0151135 A1* | 6/2013 | Aubrey | G08G 1/0116 701/118 |
| 2013/0197790 A1* | 8/2013 | Ouali | H04N 19/97 701/118 |
| 2013/0238192 A1* | 9/2013 | Breu | G01S 13/726 701/41 |
| 2014/0013255 A1* | 1/2014 | Fukuoka | G06F 3/0484 715/765 |
| 2014/0200787 A1* | 7/2014 | Takahashi | B60T 8/1755 701/83 |
| 2015/0166062 A1* | 6/2015 | Johnson | B60W 30/12 701/41 |
| 2016/0320470 A1* | 11/2016 | Othily | G01S 5/0289 |
| 2016/0343147 A1* | 11/2016 | Nukaga | G06F 17/30 |

\* cited by examiner

SITE-SPECIFIC TRAFFIC ANALYSIS INCLUDING IDENTIFICATION OF A TRAFFIC PATH

BACKGROUND OF THE INVENTION

1. Field of the Invention

The present invention relates to a device for site-specific traffic analysis, including an arrangement of at least one radar sensor at a traffic space and including an evaluation unit.

2. Description of the Related Art

Induction loops (also referred to as contact loops) which are embedded into the roadway are known for the detection of vehicles in a traffic lane in front of traffic lights, which allow the presence of the vehicle to be detected by a change in the inductivity due to a vehicle situated over the induction loop. However, the necessary installation of the wire loop in the roadway is complex. Moreover, an induction loop only allows the detection of a sufficiently large metallic object.

In addition, light barrier measuring devices are known, in which a light barrier is oriented transversely to the roadway. A vehicle passing through the light barrier is thus detectable. A transmitter must be situated on one side of a roadway for this purpose, while a reflector or a receiver is situated on the other side of the roadway. If a light barrier extends across a roadway having multiple traffic lanes, a distinction regarding on which traffic lane a detected object is situated is not readily possible.

Published German patent document DE 10 2007 032 091 B3 describes a method for monitoring a railroad crossing, in which initially an image of an object situated on a road section on one side of a danger zone is recorded with the aid of cameras directed in a first direction and cameras directed in the opposite direction, and the object is detected in a road section situated on the other side of the danger zone by comparing the image to the image of another camera. In this way, it should be possible to signal a danger zone-free railroad crossing.

Published German patent application document DE 10 2006 040 542 A describes a device for monitoring a railroad crossing using a video camera, whose signal is transmitted to a train with the aid of radio signals. In this way, a train operator should be able to detect the area of the railroad crossing, although no visual contact exists yet.

Published German patent application document DE 196 12 579 A1 describes a system for monitoring a danger zone at full barrier railroad crossings including a rotating radar distance meter, which horizontally scans the danger zone. Reference marking points are situated on the boundary of the danger zone to limit the scanning to the area within these marking points. As an alternative, sector elements of the danger zone may be stored according to length and angle, and the scanning of the danger zone may be limited to the stored sector elements with the aid of electronic means.

In the known danger zone monitoring with the aid of a rotating radar range finder, the configuration of the space to be monitored must be adapted to the existing danger zone in a complex manner.

BRIEF SUMMARY OF THE INVENTION

It is an object of the present invention to create a device for site-specific traffic analysis, which allows a more reliable and more accurate traffic analysis than known systems.

This object is achieved according to the present invention by a device for site-specific traffic analysis, including an arrangement of at least one radar sensor at a traffic space, and including an evaluation unit which is configured to ascertain object trajectories from chronological sequences of object positions of respective objects which are detected by the radar sensor and moving in the traffic space, to identify the location of at least one traffic path based on a concentration of object trajectories, and to assign further detected objects to a particular traffic path whose location has been identified.

For example, the particular traffic path may be a traffic path in the form of a traffic lane, a foot path or a track. In the case of a traffic path for a means of transportation, such as vehicles or trains, the traffic path is single-lane and then corresponds to a traffic lane or a track.

A particularly simple installation of the device results from the device being configured to identify the location of a traffic path. In this way, the location of a traffic path may be automatically identified, without requiring an exact orientation or positioning of the radar sensor with respect to the traffic space to be monitored. By assigning the detected objects to a thus identified traffic path, objects belonging to the same traffic path may be evaluated more accurately as a result of the assignment. For example, objects moving outside a traffic path may be excluded for the evaluation of the traffic on the traffic path. By assigning the particular detected objects to the particular traffic path, a traffic analysis which is related to the traffic path is thus made possible. For example, if the locations of multiple traffic lanes are ascertained, a traffic analysis separated according to traffic lanes may be carried out. It is thus not necessary to predefine the number of traffic lanes. Rather, the individual traffic lanes may be detected based on the detected object movements.

An object trajectory is determined from the chronological progression of the object positions. For example, the ascertaining of object trajectories may involve combining chronological sequences of object positions of respective objects which are detected by the radar sensor and moving in the traffic space to form object trajectories.

The object is further achieved by a corresponding method for traffic analysis using positioning data of at least one site-specific radar sensor situated at a traffic space, including the following steps:

ascertaining object trajectories from chronological sequences of object positions of respective objects which are detected by the radar sensor and moving in the traffic space;

identifying the location of at least one traffic path based on a concentration of object trajectories; and assigning respective objects detected by the at least one radar sensor to a respective traffic path, whose location has been identified.

DETAILED DESCRIPTION OF THE INVENTION

Figure 1:
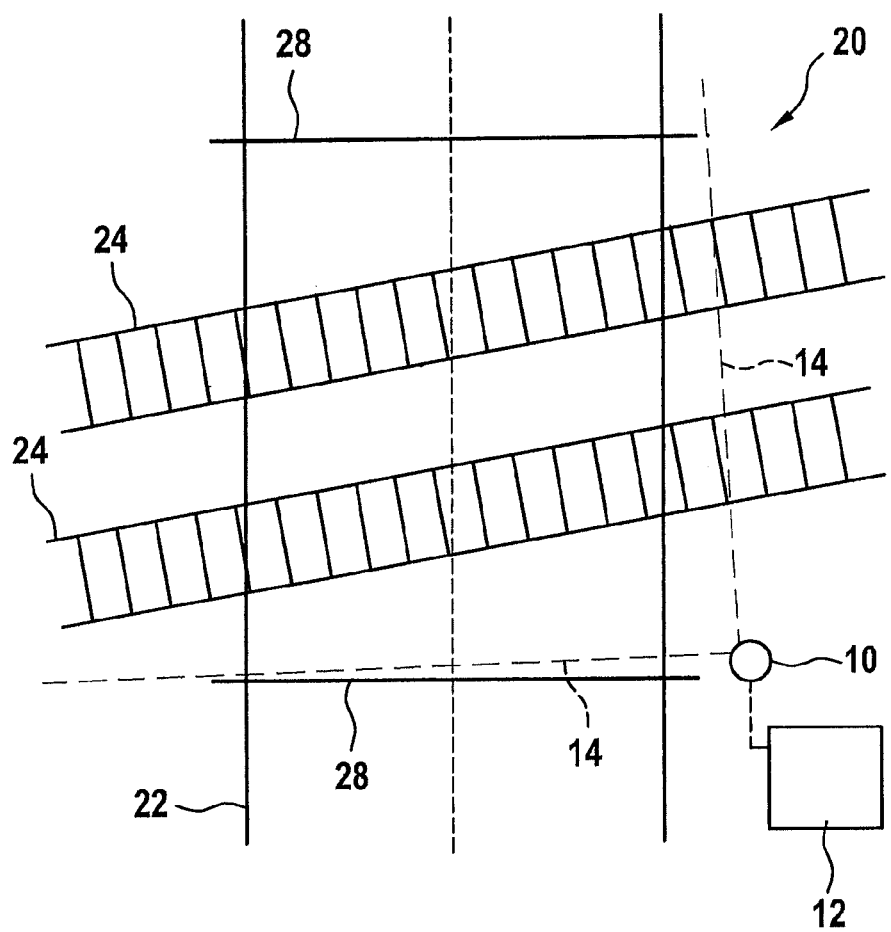
FIG. 1 shows a schematic top view onto a traffic space having a device for site-specific traffic analysis.

FIG. 1 shows a schematic illustration of a radar sensor 10 and of an evaluation unit 12 connected to radar sensor 10 or integrated therein. Radar sensor 10 is an FMCW radar sensor having a transceiver device, which includes a patch antenna array and has a schematically illustrated field of vision 14, which includes an azimuth angle range of at least 90°. Multiple antenna elements are situated horizontally offset from each other. Field of vision 14 preferably includes an azimuth angle range of at least 160°.

Radar sensor 10 is situated at the edge of a traffic space 20, which is captured by field of vision 14.

Traffic space 20 includes a road 22 and may include a railroad having tracks 24 and/or a footpath 26 (FIG. 2), for example.

FIG. 1 additionally schematically shows barriers 28 of a railroad crossing.

Figure 2:
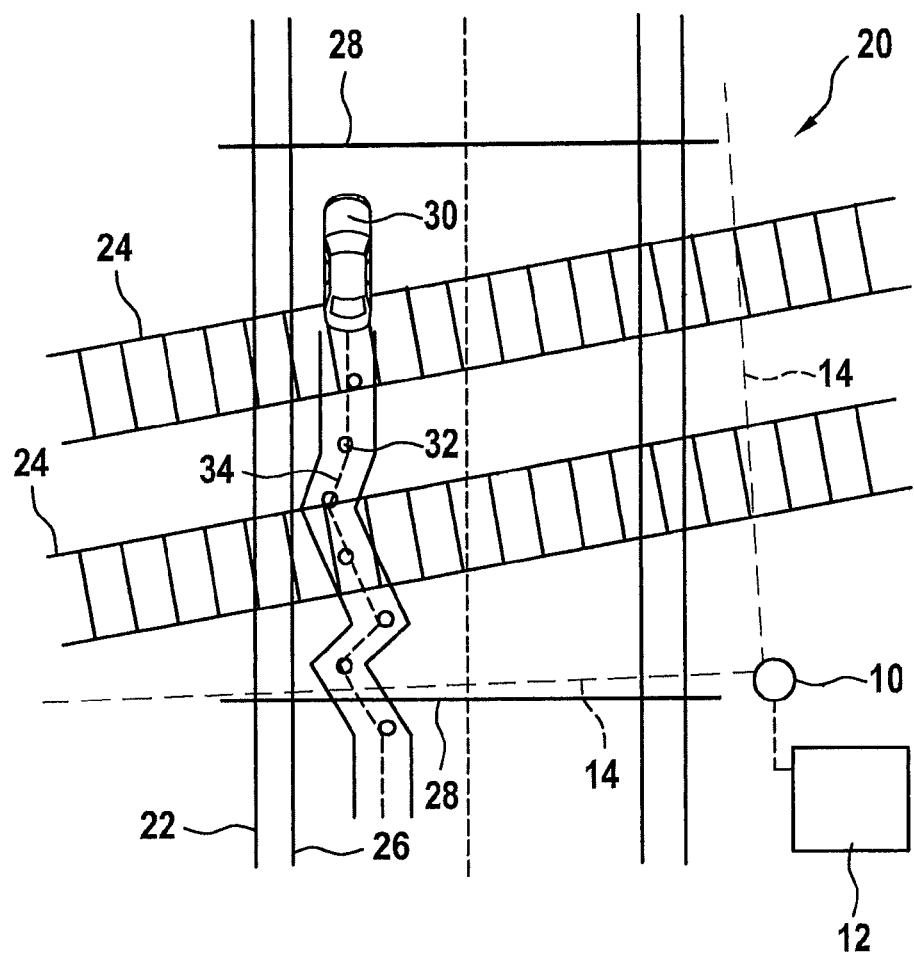
FIG. 2 shows an exemplary illustration to explain the ascertainment of an object trajectory.

FIG. 2 shows, by way of example, a situation with an object 30 in the form of a vehicle detected by radar sensor 10. Evaluation unit 12 receives data on object positions 32 for detected object 30, several of these object positions being shown in traffic space 20 in FIG. 2. Evaluation unit 12 moreover receives data for a detected object 30 on the object speed, in particular the relative speed in relation to stationary radar sensor 10, in a manner known per se.

Optionally, evaluation unit 12 may receive additional object data on a detected object 30, for example object reflection data, such as a backscatter activity, an expansion in the horizontal direction and/or a height of object 30. The height information may be determined, for example, from elevation angle-dependent reflection data of object 30. A horizontal expansion may be ascertained, for example, by assigning multiple reflection centers to an object 30.

An object trajectory 34 is determined from the chronological progression of the ascertained object position data 32.

The determined object trajectories 34 are stored.

Figure 3:
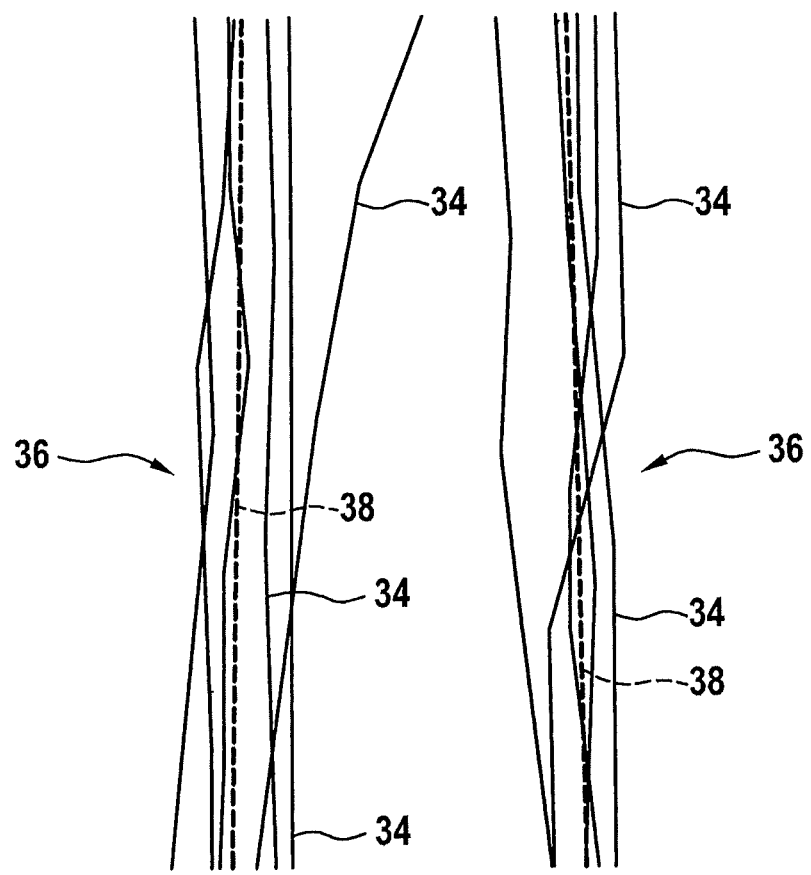
FIG. 3 shows a schematic illustration for the ascertainment of a characteristic trajectory of a concentration of trajectories.

FIG. 3 schematically shows concentrations 36 of object trajectories 34 extending spatially very close to each other. These concentrations 36 are determined. For this purpose, for example, groups of similar or approximately spatially coincident trajectories 34 are formed from object trajectories 34 which are determined for multiple objects 30 based on their respective similarities. For example, a characteristic trajectory 38 may be determined in each case for this purpose. Characteristic trajectory 38 is optionally smoothed or straightened and is then determined as the location of a traffic path.

A distinction of the type and/or width of the traffic path may be made, for example, based on a spatial variance within a concentration of trajectories 34, ascertained object expansions and/or further object backscatter properties. Trajectories 34 may optionally be distinguished based on their movement direction. It is possible to distinguish unidirectional traffic paths, such as traffic lanes and tracks, from bidirectional traffic paths, such as footpaths.

For example, traffic paths may be ascertained during a teach-in phase of the device according to the method described hereafter.

Detected objects 30 are classified and assigned, for example, in each case to the groups vehicle, person and, if a railroad 24 is present, train. The classification may be carried out based on the radar backscatter properties, the expansion and/or the height of the detected objects.

The object positions of detected objects 30 are determined over a period of time.

A trajectory 34 of object 30 is ascertained from the temporal changes of the object positions which are assigned to an object 30.

By determining an object trajectory 34 in each case for multiple objects 30, random errors of an individual trajectory determination may be compensated for.

For example, object properties such as an expansion and/or a height are determined for each object 30.

Trajectories 38 which are characteristic for a particular group and optionally characteristic properties are determined for the particular group of objects. In this way, it is possible in the case of road 22 shown in FIG. 2 to determine two characteristic trajectories 38 for the group "vehicle," for example, corresponding to the two lanes of road 22. Similarly, it is possible to determine two characteristic trajectories 38 for the group "person," which correspond to the progressions of the respective footpaths 26 on both sides of road 22.

Traffic lanes 40, 42 and sidewalks 44, 46 are inferred from ascertained trajectories 34 for the respective groups of objects.

Since a plurality of trajectories 34 of individual objects 30 are incorporated into the determination of characteristic trajectories 38, outliers such as a passing vehicle, for example, do not carry any weight. In this way, the locations and optionally the spatial expansion of traffic lanes 40, 42 may be reliably determined.

The object speed may also be incorporated into the classification of the objects into the individual groups, for example, provided a respective object speed allows a particular group to be inferred or excludes a group.

Figure 4:
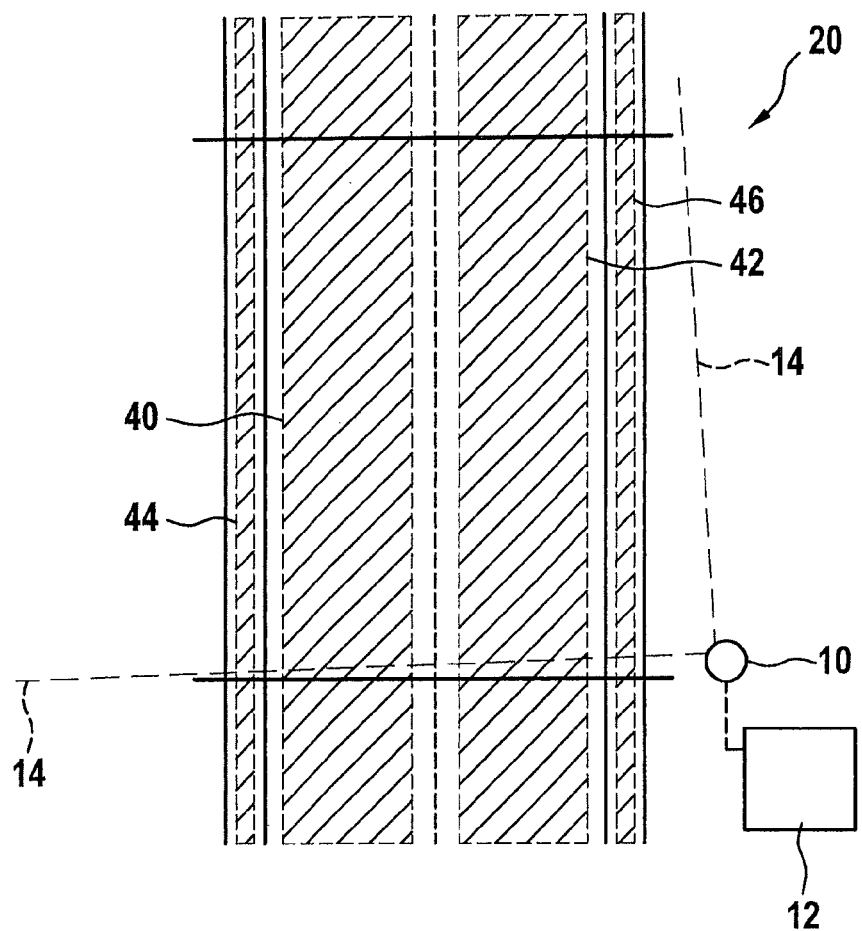
FIG. 4 shows a schematic illustration of the locations and types of traffic lanes and foot paths identified by the device.

After the teach-in phase of the device, the locations of traffic lanes 40, 42 and sidewalks 44, 46 schematically shown in FIG. 4 are thus stored in evaluation unit 12. The teach-in phase may be ended if a sufficient data base exists, or continuous teaching-in may be allowed, even during the operation of the device following the initial teach-in phase.

After the ascertainment of the locations of traffic lanes 40, 42 and optionally of sidewalks 44, 46 and railroads 24, detected objects 30 are assigned to particular traffic paths L1, . . . , Ln.

Objects located outside the traffic paths are not considered in the assignment of the detected objects to the traffic paths.

These objects 30 assigned to individual traffic paths are then classified in the described manner as person, passenger car, truck or the like, based on the aforementioned properties such as backscatter activity, expansion and/or height. It is also possible to combine the classes passenger car and truck into the class motor vehicles, for example.

For the particular traffic paths, a traffic analysis which is based on the particular traffic paths is then carried out, i.e., an evaluation of the object data of the objects which continue to be detected. Different examples are described hereafter by way of example based on traffic lanes 40, 42. A corresponding evaluation may also be carried out for the other traffic paths.

For the detected objects assigned to a particular traffic lane 40, 42, average speed $v_{i,avg}$ and minimal speed $v_{i,min}$ are determined, i indicating the number of the particular traffic lane.

For example, a minimal distance, an average distance and/or a maximal distance of objects 30 following the traffic lane may be determined for the particular traffic lane.

For example, average speed $v_{i,avg}$ may be determined for the particular traffic lane.

It is possible, for example, to determine the traffic intensity or the traffic flow for the particular traffic lane as $P_i = M/t$, M denoting the number of vehicles detected in the lane during a time period t.

It is also possible to determine the traffic density for the particular traffic lane as $d_i = N/s = P_i N_j$. N denotes the number of vehicles which are simultaneously present on the route section having length s.

Based on the above-mentioned characteristic variables, an evaluation of the traffic situation may be carried out as a function of the evaluation model used, in particular a classification of the traffic situation into one of the classes "unobstructed traffic," "slow-moving traffic" and "congestion." This evaluation may also be carried out individually for the particular traffic lane.

An automatic analysis of the traffic in the traffic space may thus be carried out in the described manner. In particular, the risk of congestion may be evaluated.

As a result of the lane-specific traffic analysis and the automatic detection and positioning of the lanes, better and more accurate information is available for the subsequent traffic analysis. As described, it is also possible to ascertain properties of the particular traffic lanes, such as their width.

The described method and the described device are not limited to the detection of spatially separated traffic lanes. The described algorithm may also be used to detect intersecting traffic lanes, for example, such as an intersection of railroads 24 with traffic lanes 40, 42 and walkways 44, 46. However, intersecting traffic paths may also be detected on road junctions or other intersecting traffic paths, and their location may be ascertained.

While only one radar sensor 10 was described in the described example, it is also conceivable for the device to include multiple radar sensors, whose fields of vision may optionally overlap. In particular, multiple sensors 10 may be situated in a stationary manner at different positions. The ascertained characteristic variables of the monitored traffic may be used, for example, to automatically determine speed limits, such as on highways. However, the introduced device may also be used to control traffic lights at intersections, where it may replace or supplement conventional contact loops.

What is claimed is:

1. A device for site-specific traffic analysis, comprising:
at least one radar sensor monitoring a traffic space; and
an evaluation unit configured to: (i) ascertain object trajectories from respective chronological sequences of object positions of respective objects detected by the radar sensor and moving in the traffic space, (ii) identify the location of at least one traffic path based on a respective concentration of the object trajectories, and (iii) assign further detected objects to the at least one traffic path whose location has been identified,
wherein:
the evaluation unit identifies a first concentration of a first set of the object trajectories,
the evaluation unit identifies a second concentration of a second set of the object trajectories,
at least some of the object trajectories of the first concentration are traveled by the objects corresponding thereto at different times from each other,
at least some of the object trajectories of the second concentration are traveled by the objects corresponding thereto at different times from each other,
the object trajectories of the first concentration are closer to one another in location than they are to the object trajectories of the second concentration,
the object trajectories of the second concentration are closer to one another in location than they are to the object trajectories of the first concentration,
the evaluation unit infers a first traffic path from the first concentration, and
the evaluation unit infers a second traffic path from the second concentration.

2. The device as recited in claim 1, wherein the type of the at least one traffic path is selected from a traffic lane, a walkway, and a track.

3. The device as recited in claim 2, wherein the evaluation unit is configured to carry out a summarizing evaluation of data for multiple objects assigned to the same traffic path for the determination of at least one traffic parameter selected from an average speed, a minimal speed, a minimal distance between the objects, an average distance between the objects, a maximal distance between the objects, a traffic flow and a traffic density.

4. The device as recited in claim 3, wherein, based on detected object speeds of multiple objects assigned to the selected traffic path in the form of a traffic lane, the evaluation unit is configured to evaluate a traffic situation assigned to the selected traffic lane with respect to a risk of congestion, and classify the risk of congestion associated with the traffic situation into one of at least three classes.

5. The device as recited in claim 3, wherein the at least one radar sensor includes a wide angle radar sensor having a stationary antenna array, whose field of vision includes an azimuth angle range of at least 90°.

6. The device as recited in claim 3, wherein the at least one radar sensor includes an FMCW (frequency modulated continuous wave) radar sensor configured to determine an object position and an object speed of a detected object.

7. The device as recited in claim 3, wherein the evaluation unit is configured to: (i) identify the location of multiple traffic paths, and (ii) assign further detected objects to a respective traffic path whose location has been identified.

8. The device as recited in claim 2, wherein the evaluation unit is configured to classify objects which are detected by the radar sensor and moving in the traffic space based on object reflections associated with the respective objects, wherein the detected objects are classified into object classes of at least one of different sizes and different types, and wherein passenger cars and persons are assigned to different object classes.

9. The device as recited in claim 8, wherein the evaluation unit is configured to identify the location of the at least one traffic path based on a concentration of object trajectories related to objects of a selected object class.

10. The device as recited in claim 1, wherein:
the evaluation unit is configured to: (a) determine object expansions based on object reflections detected by the radar sensor and associated with the respective detected objects, and (b) identify the location and the type of the at least one traffic path based on the concentration of the object trajectories and based on the object expansions of the objects assigned to the respective object trajectories, and
at least one of the object expansions is a horizontal expansion determined by assigning multiple reflection centers to an associated one of the objects.

11. A method for traffic analysis using positioning data of at least one site-specific radar sensor monitoring a traffic space, comprising:
ascertaining object trajectories from chronological sequences of object positions of respective objects detected by the radar sensor and moving in the traffic space;
identifying the location of at least one traffic path based on a concentration of the object trajectories;

assigning respective objects detected by the at least one radar sensor to a respective traffic path whose location has been identified;

identifying a first concentration of a first set of the object trajectories, identifying a second concentration of a second set of the object trajectories, at least some of the object trajectories of the first concentration are traveled by the objects corresponding thereto at different times from each other, at least some of the object trajectories of the second concentration are traveled by the objects corresponding thereto at different times from each other, the object trajectories of the first concentration are closer to one another in location than they are to the object trajectories of the second concentration, the object trajectories of the second concentration are closer to one another in location than they are to the object trajectories of the first concentration, inferring a first traffic path from the first concentration, and inferring a second traffic path from the second concentration.

12. The method as recited in claim 11, wherein:

the evaluation unit is configured to: (a) determine object expansions based on object reflections detected by the radar sensor and associated with the respective detected objects, and (b) identify the location and the type of the at least one traffic path based on the concentration of the object trajectories and based on the object expansions of the objects assigned to the respective object trajectories, and at least one of the object expansions is a horizontal expansion determined by assigning multiple reflection centers to an associated one of the objects.

* * * * *